(12) United States Patent
Taguchi

(10) Patent No.: US 7,564,761 B2
(45) Date of Patent: Jul. 21, 2009

(54) RECORDING AND REPRODUCING DEVICE

(75) Inventor: Masakazu Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 681 days.

(21) Appl. No.: 11/137,741

(22) Filed: May 25, 2005

(65) Prior Publication Data

US 2006/0192866 A1 Aug. 31, 2006

(30) Foreign Application Priority Data

Feb. 28, 2005 (JP) ............................. 2005-053929

(51) Int. Cl.
*G11B 7/00* (2006.01)
(52) U.S. Cl. .................................................. 369/103
(58) Field of Classification Search ................ 369/103; 348/246; 359/1, 10–11, 3, 19
See application file for complete search history.

(56) References Cited

U.S. PATENT DOCUMENTS

2004/0042363 A1* 3/2004 Kobayashi et al. ....... 369/53.21
2005/0078204 A1* 4/2005 Matsuoka et al. ........... 348/247
2005/0162719 A1* 7/2005 Ogasawara et al. .......... 359/22

FOREIGN PATENT DOCUMENTS

JP   62-086968   4/1987
JP   2004-158114   6/2004

\* cited by examiner

*Primary Examiner*—Peter Vincent Agustin
*Assistant Examiner*—Chibuike K Nwakamma
(74) *Attorney, Agent, or Firm*—Greer, Burns & Crain, Ltd.

(57) ABSTRACT

A recording and reproducing device includes: a reference light irradiating section; a spatial light modulating section for generating information light; an information light irradiating section for irradiating the same region as a region irradiated with the reference light, with the information light; a light detecting section for receiving reproduction light; a known data storage section; a defect examining section for examining a defective position of the spatial light modulating section or the light detecting section by irradiating the information light and the reference light to write the known page data to the holographic recording medium, and then irradiating the medium with the reference light to read the known page data written on the holographic recording medium from the reproduction light received by the light detecting section; and a reproducing control section for restoring and reproducing the original data of the defective position using information of the defective position detected by the defect examining section.

13 Claims, 8 Drawing Sheets

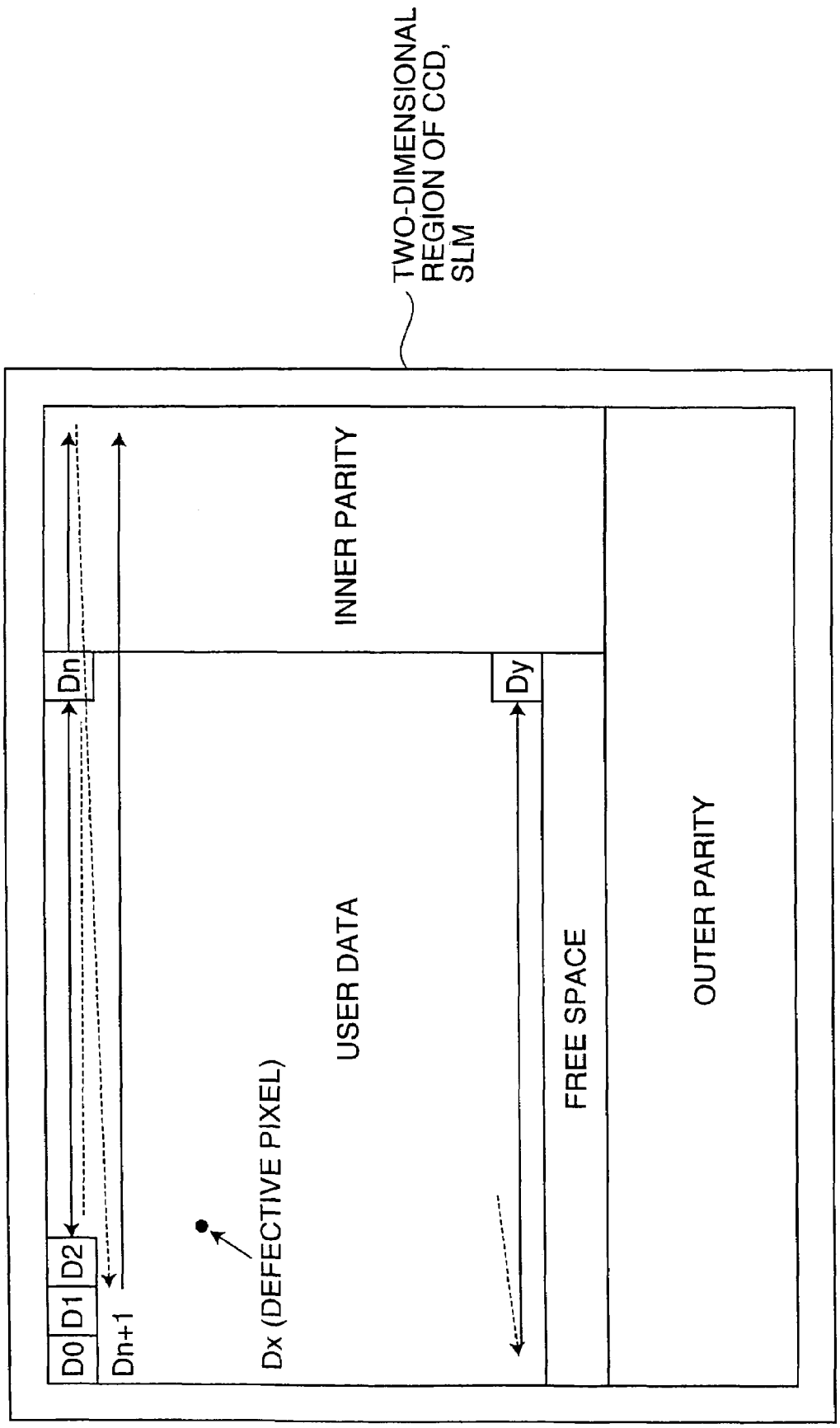

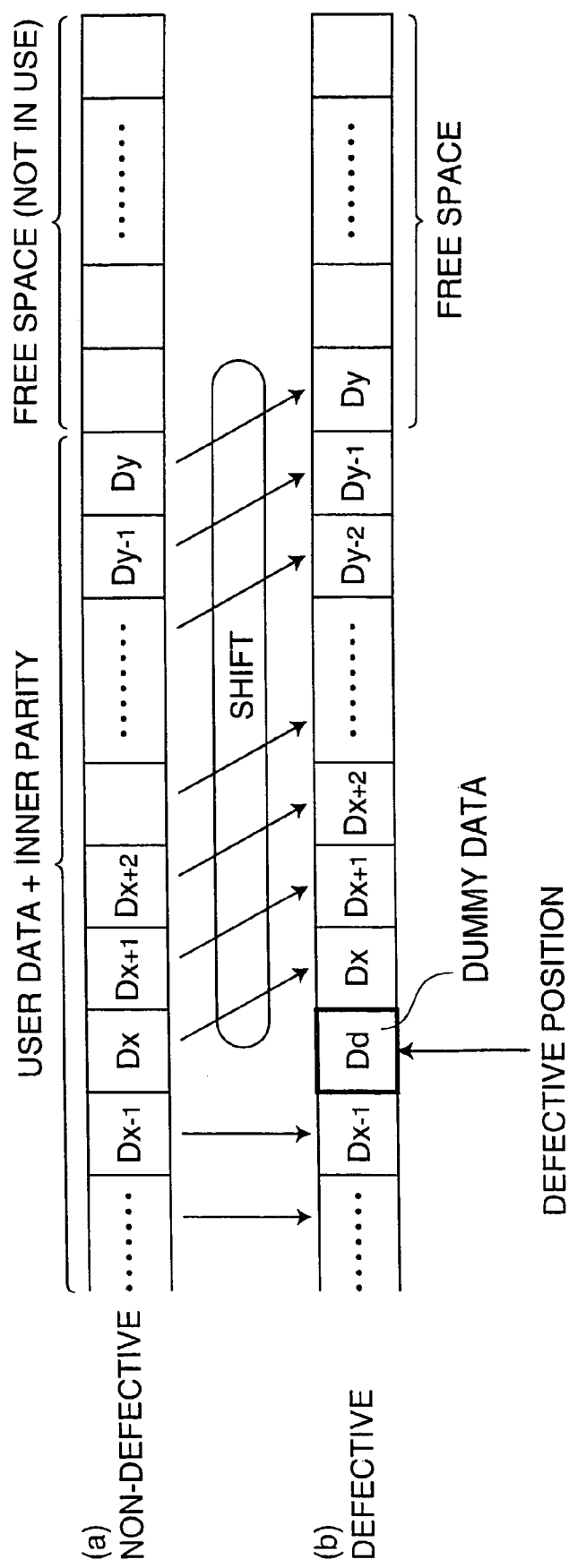

FIG.8

| | | PRESENCE OF UNMATCHED DATA | | |
|---|---|---|---|---|
| SECOND DEFECTIVE POSITION EXAMINATION | KNOWN PAGE DATA RECORDED ON MEDIUM IN ADVANCE | UNMATCHED DATA | | NO UNMATCHED DATA |
| FIRST DEFECTIVE POSITION EXAMINATION | KNOWN PAGE DATA RECORDED IN STORAGE PART 36 OF DEVICE IN ADVANCE | UNMATCHED DATA | NO UNMATCHED DATA | UNMATCHED DATA | NO UNMATCHED DATA |
| | LOCATION AND PRESENCE OF DEFECTIVE COMPONENT | DEFECT IN REPRODUCING COMPONENT | DEFECT IN MEDIUM | DEFECT IN RECORDING COMPONENT | NO DEFECT |
| | | CASE A | CASE B | CASE C | |

RECORDING AND REPRODUCING DEVICE

CROSS-REFERENCE TO RELATED APPLICATION

This application is related to Japanese patent application No. 2005-053929 filed on Feb. 28, 2005, whose priority is claimed under 35 USC §119, the disclosure of which is incorporated by reference in its entirety.

BACKGROUND OF THE INVENTION

1. Field of the Invention

The present invention relates to recording and reproducing devices, in particular, a recording and reproducing device for recording holographic information with two luminous fluxes of reference light and information light, and for reproducing the holographic information using reference light.

2. Description of the Related Art

A holographic recording method is proposed as a method for multiplexedly recording information on the same position.

Holographic recording is recording performed by separating a luminous flux from the same light source into reference light and information light; irradiating the same position on a recording medium with the reference light and the information light; generating a different interference by changing an irradiation angle or a wavelength of the reference light; and overlaying different pieces of information on the same position on the medium (see, e.g., Japanese Unexamined Patent Publication No. 2004-158114).

Herein, information light modulated into two-dimensional page information is obtained by arranging a spatial light modulator on a light path of the information light and transmitting or reflecting the luminous flux in a unit of pixels of the spatial light modulator.

The reference light, on the other hand, passes through a route different from one through which the information light passes, and is overlaid on the information light on the recording medium, so that an interference pattern is formed on the medium.

When reproducing the information recorded on the medium, only the reference light is applied onto the recorded region of the medium.

When the medium is irradiated with the reference light, reproduction light is generated, and a two-dimensional page light detector detects such reproduction light.

A reproducing signal, i.e., a light and dark signal corresponding to the recorded two-dimensional page information is output from the two-dimensional page light detector, and the recorded information is read by decoding the reproducing signal.

A CCD (Charge Coupled Device), a CMOS sensor or the like used in a digital camera and the like is used as the two-dimensional page light detector.

When reproducing the two-dimensional information of, for example, 1024 bits×1024 bits (=approximately one million bits), the CCD having an element of 1024 bits×1024 pixels (picture elements) is used.

In the CCD used in the digital camera and the like, even if one element of the CCD is defective, a rapid light intensity change is small near the defective pixel; therefore, an image to be output is usually recognized as a normal image as a whole to human eyes.

In devices having a one-dimensional solid state image sensor such as a fax machine, there is no situation in which an image to be output is entirely unreadable even when one pixel of the solid state image sensor is defective.

In such devices having the above image sensor, the defective pixel position is recorded in a memory in advance, and reproducing data of the defective position is corrected using data of normal pixels around the defective position to enhance image quality (see, e.g., Japanese Unexamined Patent Publication No. Sho 62(1987)-86968).

This correction is for generating data that is an approximate of the original data, and is not for reproducing the original data itself.

When recording information such as document data as the holographic data, the entire document data may not be reproduced if a defect is found in only one pixel. Further, when the information is not an image, there may be a rapid change in the light intensity between adjacent pixels, and an effective correction may not be performed on the defective pixel. Therefore, in the CCD used in the two-dimensional page light detector, all elements are required to operate properly. That is, it is necessary to manufacture a recording and reproducing device that uses only a CCD in which all elements are normal and are defect free.

However, in reality, when manufacturing a CCD having at least a few million pixels as used herein, it is difficult to constantly manufacture a non-defective CCD.

Further, a sophisticated manufacturing technique is necessary in manufacturing the non-defective CCD at good yield, leading to increase in cost.

As the number of pixels increase, the probability of manufacturing the defective CCD increases, thereby lowering the yield.

Thus, from the point of balance between the manufacturing cost and performance, in reality, a recording and reproducing device that has no problems in terms of practical use is desirably shipped even if a defective pixel that is not operating properly is present at a part of the CCD. Likewise, even if some defects are present in the optical components relating to reproduction other than the CCD and in optical components relating to recordation such as the spatial light modulator, it is desirable that the recording and reproducing device perform recording and reproducing without any problem.

SUMMARY OF THE INVENTION

The present invention provides a recording and reproducing device comprising a reference light irradiating section for irradiating a holographic recording medium with reference light for reading page data recorded on the holographic recording medium, a spatial light modulating section for generating information light modulated using spatial information corresponding to the page data to be written to the holographic recording medium, an information light irradiating section for irradiating the same region as a region irradiated with the reference light, with the information light, a light detecting section for receiving reproduction light generated by irradiating the holographic recording medium with the reference light, a known data storage section for storing known page data in advance, a defect examining section for examining a defective position of the spatial light modulating section or the light detecting section by irradiating the holographic recording medium with the information light modulated using the spatial information corresponding to the known page data and the reference light to write the known page data to the holographic recording medium, and then irradiating the medium with the reference light to read the known page data written on the holographic recording medium from the reproduction light received by the light detecting section, and a reproducing control section for restoring and reproducing the original data of the defective position contained in the reproduction light received by the light detecting section using information of the defective position detected by the defect examining section.

BRIEF DESCRIPTION OF THE DRAWINGS

FIG. 6 illustrates one example of a format of two-dimensional page data of the present invention;

FIG. 7 illustrates a data structure when user data of the present invention is seen one-dimensionally; and FIG. 8 illustrates one example of defective component detection using two known page data of the present invention.

DESCRIPTION OF THE PREFERRED EMBODIMENTS

Figure 1:
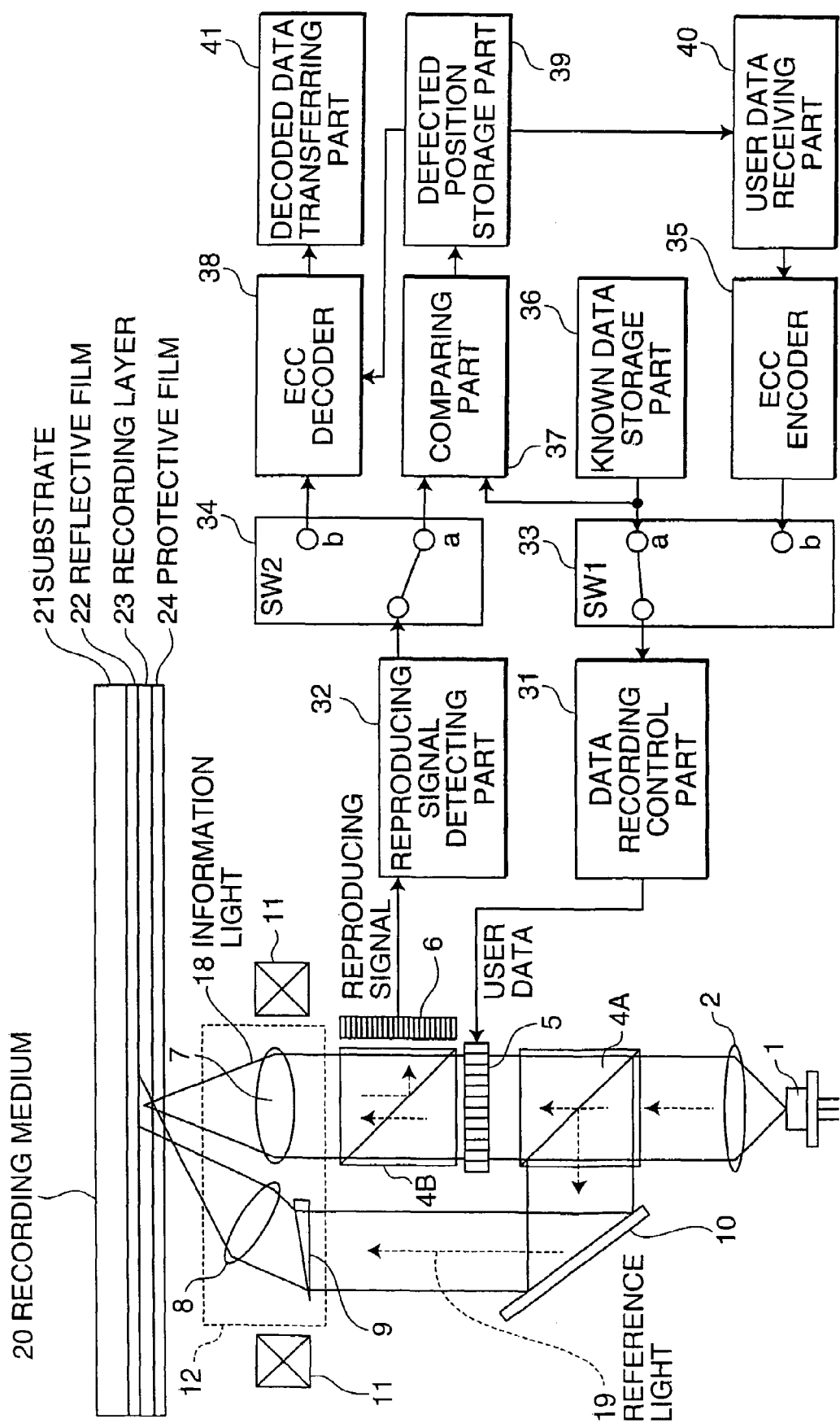
FIG. 1 is a configuration block diagram showing one example of a holographic recording and reproducing device according to the present invention.

Embodiments of the present invention will now be described with reference to the drawings. It is to be noted that the present invention is not limited to the description of the following embodiments.

Configuration of Holographic Recording and Reproducing Device

The present invention is achieved in view of the above circumstances, and provides a recording and reproducing device having a reliability wherein if the partial defect is found in a recording component or a reproducing component used in the holographic recording and reproducing device, a defective position is examined and a signal process is performed so that recording and reproducing of information is not affected by the partial defect.

With this recording and reproducing device, the data of the defective position is restored and reproduced using the defective position information detected by the examination of the defect examining section. Therefore, even in the case where the spatial modulating section or the light detecting section has a defect or is defective by its use, if the number of defects is below practical tolerance level, the data at the defective position can be correctly recorded and reproduced on the holographic recording medium. Further, the yield of the recording and reproducing device can be improved while suppressing its manufacturing cost. Thus, it is possible to provide a recording and reproducing device with a high reliability which does not affect recording and reproducing of user data.

In the present invention, the defect examining section includes comparing section for comparing the known page data stored in the known data storage section and the known page data read from the holographic recording medium by way of the light detecting section, and a defective position storage section for storing information specifying the defective position of the light detecting section or the spatial light modulating section, and the comparing section determines a position of unmatched data of the two compared known page data as a defective position and stores the information of the defective position to the defective position storage section.

In addition, the reproducing control section includes a correcting and decoding section for performing error correction to the reproducing data obtained from the reproduction light received by the light detecting section, and the correcting and decoding section restores the original data by erasing and correcting the reproducing data of the defective position using the information of the defective position.

Herein, an ECC decoder may be used as the correcting and decoding section.

In addition, the defect examining section performs examination of the defective position at a timing of switching on the power, of initialization, of a request for recording the user data or of a request for reproducing the user data, or at the lapse of every predetermined time.

The present invention also provides the recording and reproducing device further comprising a recording control section for processing the user data to be written to the holographic recording medium into two-dimensional page data and supplying the data to the spatial light modulating section, controlling the reference light irradiating section and the information light irradiating section to irradiate the holographic recording medium with the reference light and the information light corresponding to the two-dimensional page data, and recording the two-dimensional page data, wherein when the defect examining section detects the defective position, the recording control section evacuates data D1 to be written to the defective position of the user data to an evacuating position different from the defective position in the two-dimensional page data, and generates the two-dimensional page data.

Herein, the evacuating position to which the data D1 to be written to the defective position is moved may be a free space secured in advance in the two-dimensional page data.

In addition, the recording control section arranges specific dummy data in the defective position detected by the defect examining position, moves the data D1 to be written to the defective position to a position immediately after the defective position, and sequentially shifts and arranges the data rows following the data D1 and generates the two-dimensional page data.

In addition, the reproducing control section reproduces the two-dimensional page data recorded on the holographic recording medium from the reproduction light received by the light detecting section, and if the data D2 moved to the evacuated position in the reproduced two-dimensional page data is present, returns the data D2 to the original defective position.

Further, the reproducing control section reproduces the two-dimensional page data recorded on the holographic recording medium from the reproduction light received by the light detecting section, and if the data row following the data D1 to be written to the defective position is shifted and arranged in the reproduced two-dimensional page data, deletes the dummy data arranged in the defective position, returns the data D1 to be written to the defective position to the defective position, inversely shifts the data row following the data D1 and reconfigures the two-dimensional page data.

The present invention also provides the recording and reproducing device, wherein data D4 the same as known page data D3 stored in the known data storage section is recorded in the holographic recording medium in advance, and the defect examining section includes a determining section for performing a first defective position examination for, after the known page data D3 is recorded to the holographic recording medium, reading the recorded data D3' and examining the defective position, and a second defective position examination for reading the data D4 recorded in the holographic recording medium in advance and examining the defective position, and determining whether the defect is in the spatial light modulating section or in the light detecting section based on the information of the defective position detected by both defective position examinations.

Herein, when the defective position is detected by both the first and second defective position examinations, the determining section determines the defect to be in the light detecting section.

In addition, when the defective position is detected in the first defective position examination and the defect is not detected in the second defective position examination, the determining section determines the defect to be in the spatial light modulating section.

The recording and reproducing device of the present invention is a device for recording user data on the holographic recording medium and reproducing the user data recorded on the holographic recording medium.

The holographic recording medium may be a portable disc removable with respect to the device, or a medium fixedly incorporated in the device.

In the present invention, a reference light irradiating section, a spatial light modulating section, an information light irradiating section, and a light detecting section use similar components as those used in the conventional holographic recording and reproducing device.

The spatial light modulating section includes a spatial light modulator (SLM), and refers to a configuration block including circuits for supplying information to the SLM and components for physically fixing or adjusting the SLM.

The light detecting section includes an element (e.g., CCD; Charge coupled device) for detecting the two-dimensional page data, and refers to a configuration block including circuits for retrieving information from the CCD and components for physically fixing or adjusting the CCD.

The recording and reproducing device of the present invention includes functional blocks such as a defect examining section, a known data storage section, a reproducing control section, a comparing section, a defective position storage section, a correcting and decoding section, a recording control section, a determining section and the like.

These function blocks may be realized by a hardware logic using LSI or logic elements, but is mainly realized by a microcomputer including the CPU.

The operation of each function block is realized when the CPU organically activates various hardware based on the control program stored in advance in the ROM and the like.

Further, a rewritable nonvolatile memory such as a flash memory, a hard disc and the like is used as the known data storage section and the defective position storage section.

The information received or generated in the recording and reproducing process are stored in the RAM or the memory of the hard disc etc.

The reproducing control section of the present invention includes a reproducing signal detecting section, a switching section, an ECC decoder, and a decoded data transferring section described in the following embodiments and is a section that, after the reproduction light corresponding to the two-dimensional page data recorded in the holographic recording medium is received by the light detecting section, restores the user data transferable to a host device such as a personal computer using the reproducing signal, which is the reproduction light retrieved as an electrical signal.

The ECC decoder is used as a representative example of the correcting and decoding section, but restoration and reproduction of the user data is performed using error correcting code such as parity, check sum, CRC code added to the user data for error correction.

It is to be noted that the user data can be restored and reproduced at a higher error correction capability when the information of the error produced position corresponding to the defective position of the CCD and the like is provided to the ECC decoder.

The information of the error produced position is equivalent to the defective position information read from the defective position storage section.

When supplied with the defective position information, restoration and reproduction of the user data is performed in the ECC decoder in consideration of such information.

The recording control section of the present invention includes a data recording control section, a switching section, an ECC encoder, and a user data receiving section, and is a section that processes the user data supplied from the host device such as the personal computer to the two-dimensional page data, and codes such data by adding the error correcting code if necessary to supply to the spatial light modulator SLM.

When processing and generating the two-dimensional page data, if the information indicating the defective position is stored in the defective position storage section in advance, the two-dimensional page data is generated in consideration of such information.

For instance, if the positional information (defective position information) indicating the presence of a defect at a certain position on the CCD is stored in advance, such defective position information is read, the data scheduled to be written to the defective position is moved to an evacuating position different from the defective position and then the two-dimensional page data is generated.

Various methods for moving the data scheduled to be written to the defective position to the evacuating position are considered, and the details of representative examples will be hereinafter described.

A free space secured in advance in the two-dimensional page data is used as a destination to which the data is moved. The free space is a region arranged at a predetermined position in the two-dimensional page data, and is a region that is not used if there are no defects.

As hereinafter described, the data itself that is scheduled to be written to the defective position or the data outside the user data region due to backward shift of the data rows after the defective position are arranged in the free space.

The shift of the data rows may be a shift in a one-dimensional alignment direction of the user data, but when configuring the two-dimensional page data, the data rows in line in a longitudinal direction of the space and after the defective position may be shifted in the longitudinal direction. It is to be noted that the direction of the shift is not limited to the longitudinal direction and may be in any arbitrary direction.

FIG. 1 is a configuration block diagram showing one example of a holographic recording and reproducing device according to the present invention.

In FIG. 1, the holographic recording and reproducing device of the present invention mainly comprises a light source 1, a collimator lens 2, a first beam splitter 4A, a second beam splitter 4B, a spatial light modulator 5, a two-dimensional imaging element 6, an objective lens 7 for information light and reproduction light, an objective lens 8 for reference light, a prism 9, a reflective mirror 10, and a focus actuator 11.

The holographic recording and reproducing also comprises a recording and reproducing signal processing section (31 to 41) for processing a data signal to be recorded and reproduced. User data to be recorded is created by a host device (not shown) such as a personal computer, is supplied to a user data receiving section 40, and is temporarily recorded in a storage section (not shown). The storage section preferably uses a rapid accessible semiconductor element such as a RAM.

The recording and reproducing signal processing section mainly includes the user data receiving section 40 for receiving the user data transmitted from the personal computer and the like, an ECC encoder 35 for coding the received user data to generate an error correcting code, a data recording control section 31 for converting the coded user data to data of a format to be supplied to the spatial light modulator 5, a reproducing signal detecting part 32 for demodulating the reproducing signal obtained from the two-dimensional imaging element 6, an ECC decoder 38 for performing error correcting and decoding process on the demodulated data, a decoded data transferring section 41 for transferring the decoded data that is error corrected and decoded to the personal computer and the like, a known data storage section 36, a comparing section 37, a defective position storage section 39, and two switching parts SW1 and SW2 (33, 34). Further, the operation of each functional block and each optical element is controlled by a microcomputer (not shown). The microcomputer is configured by a CPU, a ROM, a RAM, an I/O controller, a timer etc. and operates hardware based on a control program stored in the RAM and the like to perform the function of each function block.

A recording medium 20 for recording holographic data is a medium in which a reflective film 22, a holographic recording layer 23, and a protective film 24 are layered in this order on, for example, a substrate 21, and information recording light (hereinafter also referred to as information light) 18 and recording reference light (hereinafter also referred to as reference light) 19 are applied thereonto from the protective film 24 side. Plural pieces of page data are multiplexedly recorded in the holographic recording layer 23.

The laser source 1 consists of a semiconductor laser element and the like, and outputs a laser beam of a predetermined wavelength in a recording mode or a reproducing mode. The laser beam is output from the laser light source 1 with a light intensity distribution of the Gaussian distribution. The light intensity of the laser beam is proportional to a luminous density.

The collimator lens 2 converts the laser beam output from the laser light source 1 to a parallel beam. The laser beam output from the collimator lens 2 as the parallel beam also has a light intensity distribution of the Gaussian distribution.

The output parallel beam enters the first beam splitter 4A and is separated into two directions.

When receiving the laser beam output from the collimator lens 2, the first beam splitter 4A separates the laser beam into the information light 18 for holographic recording directed toward the spatial light modulator 5 and the reference light 19 directed toward the objective lens 8 by way of a different light path. The second beam splitter 4B allows the information light 18 to transmit from the spatial light modulator 5 toward the objective lens 7. Further, when receiving the reproduction light returning from the recording medium 20 through the objective lens 7, the second beam splitter 4B directs such reproduction light to the two-dimensional imaging element 6.

The spatial light modulator (hereinafter also referred to as an SLM) consists of a liquid crystal display, a DMD (Deformable Mirror Device) and the like, and is used only in the recording mode. The spatial light modulator 5 modulates the information light having a uniform light intensity distribution passing through the first beam splitter 4A to the information light (two-dimensional information light) 18 indicating the two-dimensional information.

The information light 18 is light having a distribution corresponding to the two-dimensional user data supplied from the data recording control section 31 of the recording and reproducing signal processing section.

The two-dimensional imaging element 6 (hereinafter also referred to as a CCD) consists of a CCD area sensor, a CMOS area sensor and the like, and is mainly used in the reproducing mode. The two-dimensional imaging element 6 is a part for retrieving two-dimensional information recorded in the recording layer 23 of the recording medium 20 as a hologram by converting the received reproduction light to a digital signal.

The retrieved two-dimensional information, i.e., the digital reproducing signal is transmitted to the reproducing signal detecting section 32 of the recording and reproducing signal processing section.

The objective lens 7 for recordation light and reproduction light, the objective lens 8 for reference light as well as the prism 9 are integrated in a head unit 12. The objective lens 8 for reference light is arranged so as to form a predetermined angle with respect to the objective lens 7 for recordation light and reproduction light. The reference light 19 is directed toward the objective lens 8 for reference light from the first beam splitter 4A through the reflective mirror 10 and the prism 9.

The head unit 12 is displaced in a direction of the thickness of the recording medium by the focus actuator 11 so that the information light passing through the objective lens 7 and the reference light passing through the objective lens 8 interfere with each other at the recording layer 23 of the recording medium 20.

The focus actuator 11 is a driving means configured by an electromagnetic coil and the like, for adjusting the interference of the two luminous fluxes (information light 18, reference light 19).

For instance, when angular multiplexing the two-dimensional page data, the focus actuator 11 drives the objective lens 8 and adjusts the angle of incident of the reference light 19 with respect to the medium.

In the recording mode, the laser beam output from the light source 1 sequentially passes through the collimator lens 2, the first beam splitter 4A, the spatial light modulator 5, the second beam splitter 4B, and the objective lens 7 and is applied onto the recording medium 20 as the information light 18. Further, the laser beam output from the light source 1 sequentially passes through the collimator lens 2, the first beam splitter 4A, the reflective mirror 10, the prism 9, and the objective lens 8 and is applied as the reference light so as to interfere with the information light 18 at the recording layer 23 of the recording medium 20. As a result of the optical interference of the information light 18 modulated as the two-dimensional information light by the spatial light modulator 5 and the reference light 19, a hologram including two-dimensional information is recorded on the recording layer 23.

On the other hand, in the reproducing mode, as shown in FIG. 1, only the reference light is applied onto the recording layer 23 of the recording medium 20 from the first beam splitter 4A through the objective lens 8. At the irradiated location of the recording layer 23, the reproduction light based on the hologram recorded by the interference of the information light and the reference light is generated, and such reproduction light is received by the two-dimensional imaging element 6 through the objective lens 7 and the second beam splitter 4B. In the two-dimensional imaging element 6, the received reproduction light is output as an electrical reproducing signal, and the information recorded on the medium 20 as the hologram is reproduced.

That is, the reproducing data is obtained from the reproduction light.

The known data storage section 36 of the present invention is a memory where two-dimensional page data for examining defects of an optical component such as the SLM and the CCD is stored in advance.

The two-dimensional page data stored in the memory 36 is known data (known page data), and is for example, all white data for writing white information to the entire page, all black data for writing black information to the entire page, or data made up of specific binary pattern, and thus is arbitrarily set by a designer. The known page data may be data created in accordance with a certain arithmetic expression, in which case, the memory can be saved.

The known page data stored in the known data storage section 36 is supplied to the data recording control section 31 and the comparing section 37.

The comparing section 37 compares, in defect examination, the reproducing signal demodulated at the reproducing signal detecting section 32 and the known page data stored in the known data storage section 36. That is, the comparing section 37 makes a comparison to decide whether the original page data before storage matches the page data, the reproduction of the recorded data after being recorded in the medium 20 once.

The defective position storage section 39 is a memory for storing information (defective position information) of the unmatched part of the two page data as a result of comparison by the comparing section 37.

The defective position information is, for example, information indicating the position (address) of the pixel of the CCD that is equivalent to a part where values of the two pieces of page data differ.

For example, when known data D1 to be written to a pixel of address 300 of the CCD 5 does not match reproducing data D2 of the address 300 of the CCD 5 of the reproducing signals output from the CCD 5, the positional information of "address 300" is stored in the defective position storage section 39.

The positional information stored in the defective position storage section 39 is used to handle the reproducing data of the defective position as so-called erased data in error correcting and decoding by the ECC decoder 38 as described later.

Alternatively, the positional information is used to insert dummy data to a pixel specified by the positional information and then perform recordation, and to perform reproduction excluding the dummy data.

The two switching parts SW1 and SW2 (33, 34) are not physical switching elements and refer to logical switching blocks for switching the operation between two functional blocks.

More specifically, the switching parts are switching blocks for switching between the defect examining mode (a) for examining the defects of the recording and reproducing components, and the recording and reproducing mode (b) for recording and reproducing the normal user data.

In the defective examining mode (a), the reproducing signal detecting section 32 and the comparing section 37 are logically connected as shown in FIG. 1, so that the reproducing signal read from the medium is supplied to the comparing section 37.

The known data storage section 36 and the data recording control section 31 are logically connected, so that the known page data is supplied to the data recording control section 31 and the known page data is written to the medium.

In the present invention, the defect examining mode (a) is provided, and the defect of the recording and reproducing components is examined before recording and reproducing the user data or in initialization, as described later.

In the recording and reproducing mode (b), on the other hand, the two switching parts SW1 and SW2 are both logically switched to the contact point (b) of FIG. 1, so that the reproducing signal detecting section 32 and the ECC decoder 38 are connected, and the data recording control section 31 and the ECC encoder 35 are connected.

In the recording and reproducing mode (b), the transfer route of the user data through the user data receiving section 40, the ECC encoder 35, the switching section SW1 (33), the data recording control section 31, and the SLM 5 is similar to the general recording process, but in the present invention, the user data to be recorded is processed using the positional information stored in the defective position storage section 39. In the recording and reproducing mode (b), the transfer route of the reproducing signal through the CCD 6, the reproducing signal detecting section 32, the switching section SW2 (34), the ECC decoder 38, and the decoded data transferring section 41 is similar to the general reproducing process, but the data of the defective position is restored and reproduced using the positional information stored in the defective position storage section 39.

EXAMPLES OF DEFECT EXAMINING PROCESS AND RECORDING AND REPRODUCING PROCESS OF THE PRESENT INVENTION

Examples of a defect examining process and a recording and reproducing process of the present invention will now be described.

In the present invention, at least one defect examination is carried out before the recording and reproducing process.

The defect examining process includes defect examination of the CCD 6 serving as a reproducing component and defect examination of the SLM 5 serving as the recording component, but a case of examining the defect of the CCD 6 will be mainly described in the following examples. It is to be noted that the defect examination of the SLM 5 can be generally performed in a similar manner.

First Example

Herein, a case of examining the defective position of the CCD 6 and performing erase and correction of the pixel of the detected defective position will now be described.

The erase and correction is error correction using the supplied defective position information, with a pixel of the detected defective position as erased data.

In the first example, the defective position information acquired by the defect examination is supplied to the ECC decoder 38 to enhance the error correction capability of the ECC decoder and to properly restore and reproduce the data of the defective position.

Generally, in the error correcting process using the ECC, if the position of the pixel of the CCD where the error is produced, that is, the defective position is known, the error correction capability can be enhanced, and thus the defective position of the CCD is detected in advance to handle the data corresponding to the defective position as the erased data. The original data at the position where defect is found can be restored and reproduced through the ECC error correcting process in a substantially reliable manner by supplying the positional information of the defective pixel to the ECC decoder 38.

In a case where the ECC decoder 38 has an error correction capability of 5 bytes with respect to the supplied data, for example, when generally assuming the product code using the Reed-Solomon code, the error correction capability becomes twice, i.e., 10 bytes when the information of the position where the defect occurred is supplied to the ECC decoder 38.

When a great number of defects beyond the error correction capability of the ECC decoder 38 are produced at the CCD, data reproduction cannot possibly be performed, but the CCD that has been conventionally discarded as a defective good can be used as a non-defective good by enhancing the error correction capability, and thus the yield of the CCD for holographic recording and reproducing can be improved.

Therefore, the possibility of using the CCD having pixel defect as the non-defective good increases, and the manufacturing cost lowers.

Defect Examining Process

Figure 2:
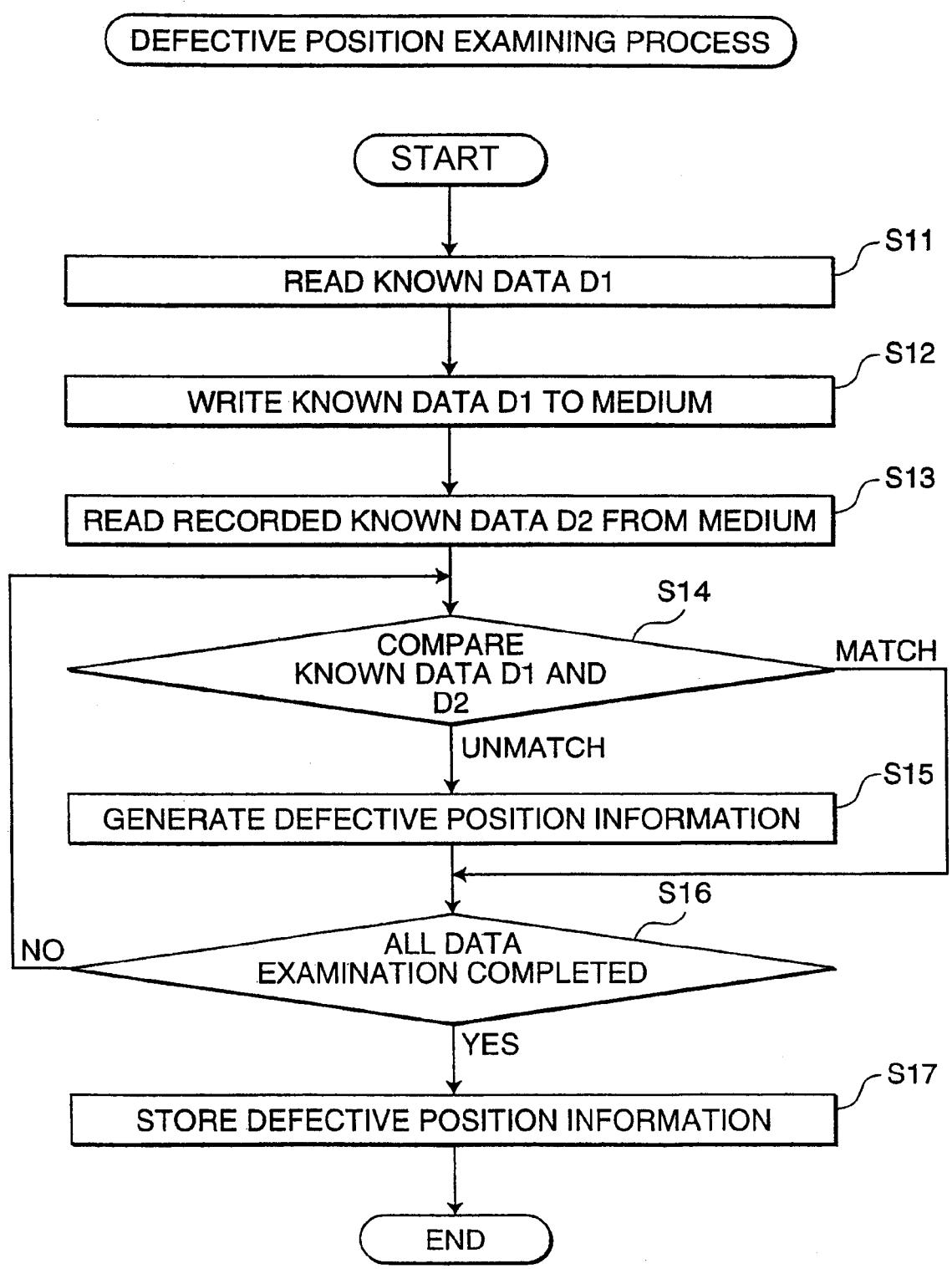
FIG. 2 is a flowchart of a defect examining process according to the present invention.

FIG. 2 is a flowchart showing the defect examining process of the present invention.

In the defect examining process, the switching parts 33 and 34 are assumed to be switched as shown in FIG. 1.

In step S11, the known page data D1 is read out from the known data storage section 36. In step S12, the data recording control section 31 writes the read known page data D1 to a specific position on the medium 20.

In writing, the recording optical component including the SLM 5 operates as designed, and if the defect is not found, the known page data D1 should be written to the medium properly.

The recording optical component including the SLM 5 and the medium are assumed to be non-defective in the following description.

In step S13, the reproducing signal detecting section 32 reads the known page data D2 recorded at the specific position from the medium 20. The reference light 19 is applied onto the medium, the reproduction light corresponding to the recorded known page data is detected by the CCD 6, and the known page data D2 is read and supplied to the comparing section 37.

In step S14, the known page data D1 stored in the known data storage section 36 and the read known page data D2 are compared for every pixel.

If the data match, the process proceeds to step S16, and a check on whether the examination of all the data are completed is made, and if data that has not been checked is present, the process returns to step S14 and the data of the next pixel is compared.

In step S14, if the data of a certain pixel does not match, such pixel is assumed to be defective, and thus the process proceeds to step S15, and the defective position information is generated.

If the defect is not found in the recording optical component and the medium, the CCD 6 may be defective, and thus the information indicating that the pixel of the CCD corresponding to the unmatched pixel is defective is generated.

In step S16, when the examination on all the data is completed, the process proceeds to step S17, and all the defective position information generated in step S15 are stored in the defective position storage section 39.

As such, when the defect is found in the CCD 6 of the recording and reproducing device of the present invention, the information relating to the defective position is stored in the storage section 39.

The defect examining process may be performed at a timing of switching on the device, of initialization, of inserting a changeable medium, or the like.

As the CCD deteriorates with frequency of usage of the device and elapse of time, the defect examining process is preferably performed on a regular basis (every day, once every month, etc.) to update the defective position information constantly to its latest information.

Further, when a request for the recording and reproducing process of the normal user data is made, the defect examining process may be performed before actually starting the recordation or reproduction of the data. The time for recording and reproducing thus becomes longer, but the reliability of recording and reproducing the data can be further enhanced.

The examination may be carried out when a user inputs a defect examination command.

Data Reproducing Process in First Example

Figure 3:
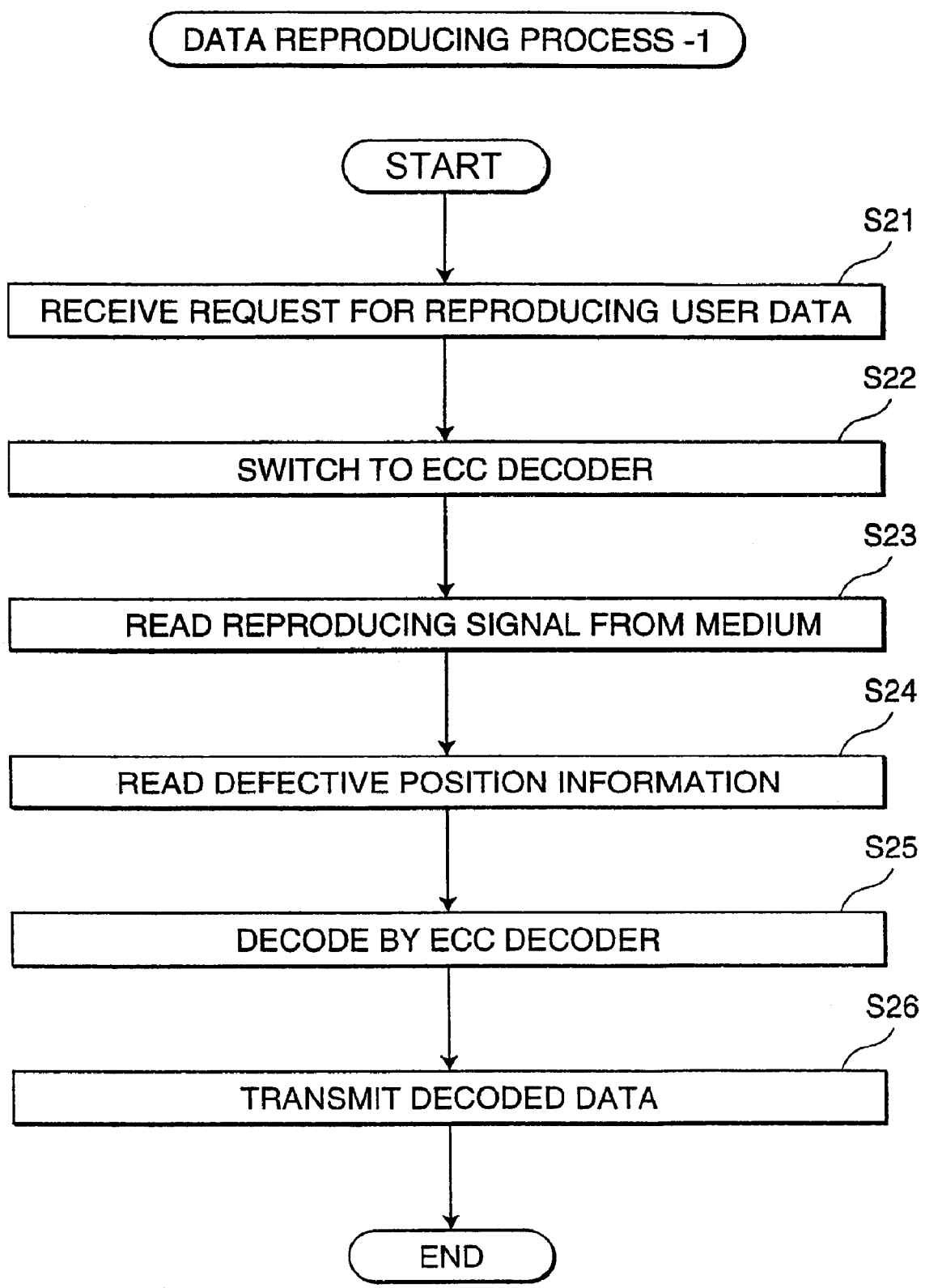
FIG. 3 is a flowchart of a data reproducing process in a first example of the present invention.

FIG. 3 is a flowchart for the reproducing process of the user data in the first example.

In step S21, a request for reproducing the user data is received from the personal computer and the like.

The request for reproduction includes information such as logic address with respect to the medium 20 and the file name to be reproduced.

Next, in step S22, the switching section SW2 (34) is switched to logically connect the ECC decoder 38 and the reproducing signal detecting section 32.

In step S23, the reproducing signal detecting section 32 reads the reproducing signal from the medium.

The reference light 19 for reading the page data corresponding to the requested logic address is applied onto the medium, and the two-dimensional page data of the medium 20 is retrieved by the reproduction light and detected on the CCD 6.

The detected reproducing signal is supplied to the ECC decoder 38.

If the CCD 6 is defective, the data of the defective position is detected as abnormal reproducing data.

In step S24, the defective position information is read from the defective position storage section 39 and supplied to the ECC decoder 38.

In step S25, the ECC decoder 38 performs erase and correction and decoding of the data using the supplied defective position information.

As mentioned above, since the defective position information is supplied, the data of the supplied defective position is handled as the erased data, and error correction is carried out at high error correction capability, and the user data of the defective position is restored and reproduced properly.

The two-dimensional page data including the properly restored and reproducing data of the defective position is supplied to the decoded data transferring section 41, and is transmitted to the host device such as the personal computer that requested for reproduction of data (step S26).

As mentioned above, the reproducing process is carried out by performing error correcting and decoding using the defective position information, and thus the CCD 6 of the recording and reproducing device is not discarded and is used even if the defect is initially present or if the defect is produced or increased through usage.

Second Example

An example of when, after examining the defective position of the CCD 6 and creating the defective position information, the dummy data is written to the pixel of the defective position in recording, and restoration and reproduction are performed with the dummy data recorded in the defective position deleted in reproduction will now be described.

In the second example, the examination of the defective position of the CCD 6 is performed. Similar processes as in FIG. 2 described in the first example are performed.

In the second example, among the user data supplied during the recording request, the data group after the data to be written to the defective position is moved or the data to be written to the defective position is moved, and the dummy data $D_d$ is inserted to the defective position.

The dummy data $D_d$ is an arbitrary data defined in advance.

The destination to where the data is moved is a space (free space) secured in advance in the two-dimensional page.

FIG. 6 shows one example of a format of the two-dimensional page data.

This is a format in which the one-dimensional user data is product coded, and the user data is from $D_0$ to $D_y$. The two-dimensional page data corresponds to the information of the two-dimensional space region of the SLM 5 and the CCD 6.

The one-dimensional user data ($D_0$ to $D_y$) is arranged in the user data region and the parity is added for each column in the lateral direction of the figure, which parity is arranged in an inner parity region.

Further, the parity is added to the data lined in the row direction, and is arranged in the outer parity region.

FIG. 6 shows an example in which a free space is provided after the last data $D_y$ of the user data region.

The free space is a space where no data is usually written, and is used as an evacuating region of the user data when a defective position is found in the CCD 6.

For example, in FIG. 6, suppose that a defect is found in the CCD pixel at the position of data $D_x$ of the user data.

The data of this defective position is abnormal data when read out. Thus, before writing the user data, the data $D_x$ scheduled to be written to the defective position is arranged in the free space, the two-dimensional page data with the dummy data $D_d$ arranged in the defective position is created, and such two-dimensional page data is written to the medium. In reproducing, the data $D_x$ written to the free space is read, and the dummy data $D_d$ of the defective position is substituted with the data $D_x$ read from the free space.

The user data may be processed by inserting the dummy data $D_d$ to the defective position, shifting the user data ($D_x$ to $D_y$) after the defective position including the data $D_x$ of the defective position backward by one pixel, and arranging the last user data $D_y$ in the free space.

FIG. 7 illustrates one example of how the free space is used when the dummy data is inserted in the data structure when the user data is seen one-dimensionally.

FIG. 7(*a*) shows the one-dimensional arrangement of the user data ($D_{x-1}$ to $D_y$) when defect is not found in the CCD.

FIG. 7(*b*) shows the one-dimensional arrangement of the user data written to the medium when defect is found at the position where the data $D_x$ is to be recorded of the CCD.

In FIG. 7(*b*), the dummy data $D_d$ is inserted to the position where the data $D_x$ is normally written. The data group of the user data $D_x$ to $D_y$ is shifted backward by one pixel. That is, the data $D_x$ is arranged at the position where $D_{x+1}$ is normally written, the data $D_{y-1}$ is arranged at the position where $D_y$ is normally written, and further, the last data $D_y$ is arranged at the head position of the free space.

When the user data is recorded in a format as shown in FIG. 7(*b*), a process of deleting the dummy data $D_d$ and returning the shifted data ($D_x$ to $D_y$) to the format of FIG. 7(*a*) is performed in reproducing.

A great number of defects may be present in the CCD 6, and thus the free space is preferably secured in advance so that a great number of data can be written as much as possible.

It is to be noted that securing a large free space reduces the memory capacity of the user data, and thus the size of the free space must be determined in consideration of the balance between the manufacturing cost and the required memory capacity.

In FIG. 7(*b*), if the number of defective positions is n, the shifted user data is arranged in n number of regions in the free space.

The movement of the user data when the defect is found in the CCD 6 is not limited to FIG. 7, and may be moved based on other rules.

Further, the position of providing the free space is not limited to FIG. 6, and may be provided at a convenient position in correspondence with the format structure of the defined data.

Data Recording Process in Second Example

Figure 4:
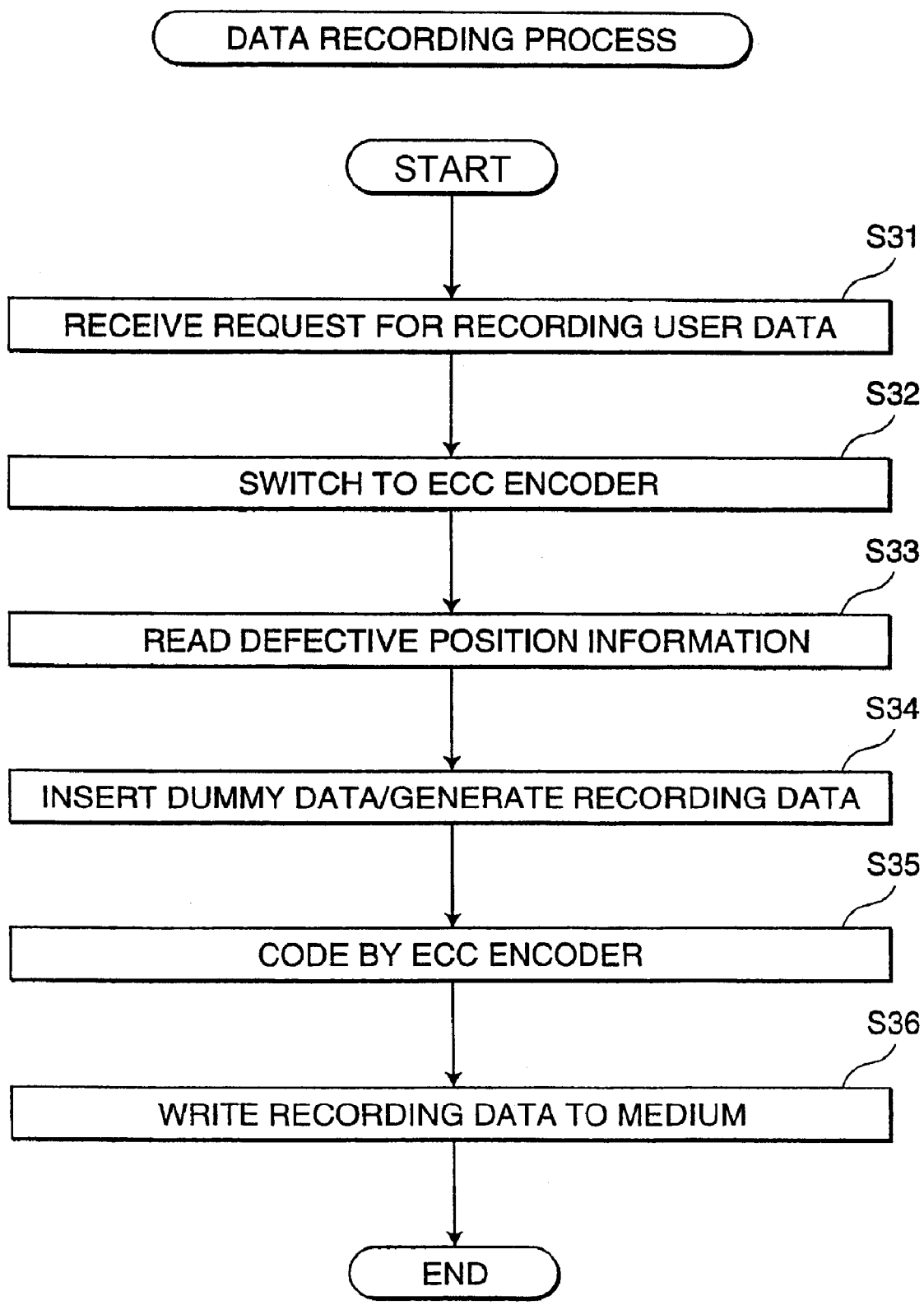
FIG. 4 is a flowchart of a data recording process in a second example of the present invention.

FIG. 4 shows a flowchart for the data recording process of the second example of the present invention.

In step S31, the user data receiving section 40 receives the request for recording the user data transmitted from the personal computer and the like.

The request for recording includes information such as logic address to be written, the file name to be written and the user data content.

Next, in step S32, the switching section SW1 (33) is switched to logically connect the ECC encoder 35 and the data recording control section 31.

In step S33, the defective position information is read from the defective position storage section 39.

In step S34, using the read defective position information, the dummy data is inserted to the defective position and the recording data to be written to the medium is generated.

If, for example, a plurality of defective positions indicated by the defective position information exists, the dummy data $D_d$ is inserted and arranged in all the defective positions, and the recording data in which the defective position is skipped and in which the user data after the first defective position is shifted backwards is generated. The recording data is configured as the two-dimensional page data.

Alternatively, the recording data in which only the data scheduled to be recorded to the defective position is arranged in the free space may be generated.

In step S35, the ECC encoder 35 performs ECC coding on the recording data generated in step S34.

The coded recording data is supplied to the data recording control section 31, and write process to the medium is executed (step S36).

This write process is performed by irradiating the same position on the medium with the information light 18 and the reference light 19 simultaneously, as mentioned above.

According to the above recording process, the user data including the dummy data in the defective position and shifted and arranged in the free space by the number of defective positions is recorded in the medium as the two-dimensional page data.

Data Reproducing Process in Second Example

Figure 5:
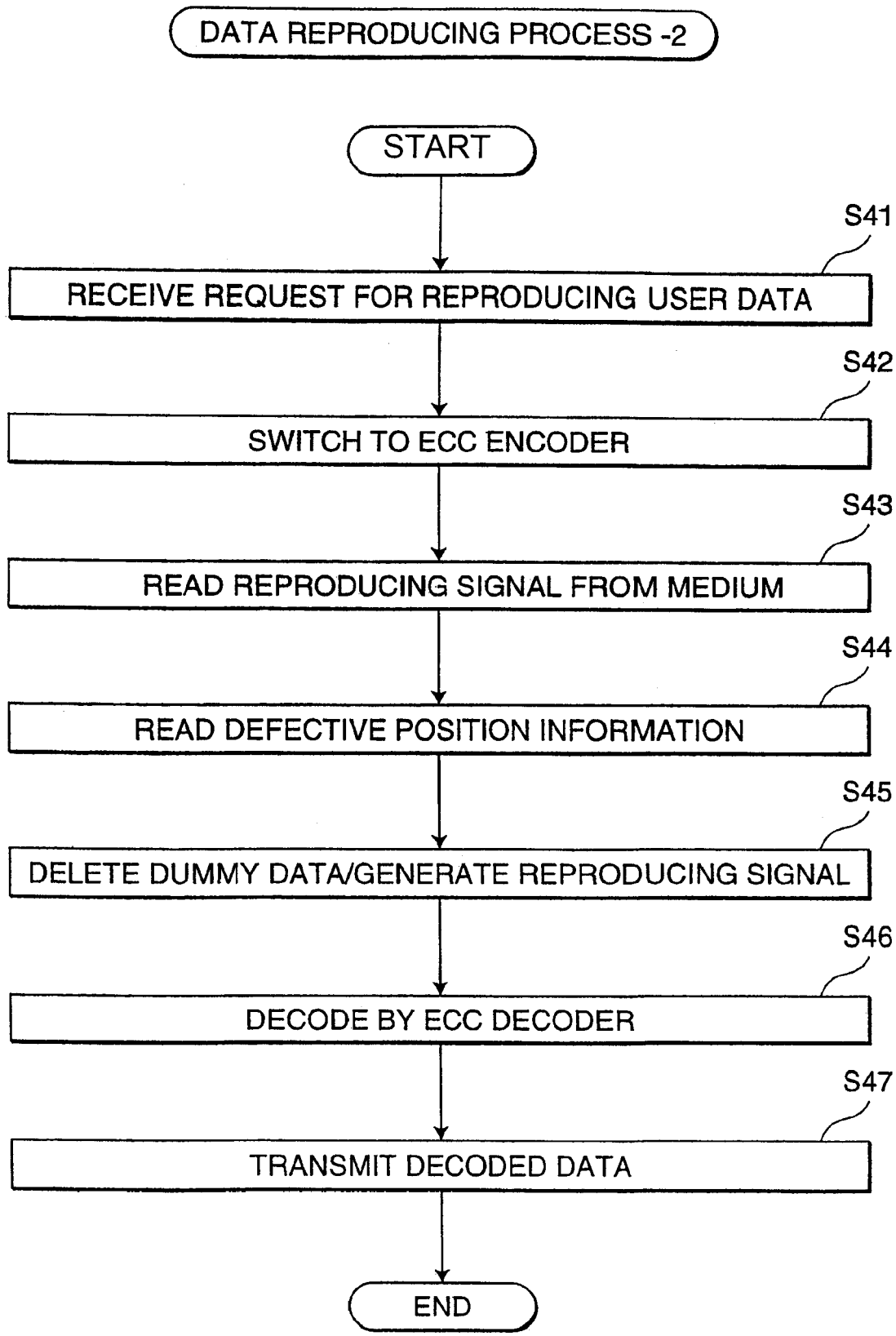
FIG. 5 is a flowchart of a data reproducing process in the second example of the present invention.

FIG. 5 shows a flowchart for the data reproducing process of the second example of the present invention.

Steps S41 to S44, and steps S46 and S47 shown in FIG. 5 correspond to steps S21 to S26 shown in FIG. 3. That is, the switching process to the ECC encoder is performed when receiving the request for reproducing the user data from the personal computer and the like, and then the requested reproducing signal is read from the medium, and the defective position information is read from the defective position storage section 39 (steps S41 to S44).

In step S45, the position of the dummy data included in the reproducing data is recognized from the defective position information, and thus the position is searched for and the dummy data is deleted.

The process for returning the original recording data of the defective position, which has been evacuated to the free space, or the user data after the defective position, which has been shifted, to its original position is performed to generate the reproducing signal equivalent to the format of the user data itself that was to be recorded.

According to such process, the data of the format shown in FIG. 7(a) read when a defect is not found is reproduced. The error correcting and decoding is performed by the ECC decoder, and the obtained decoded data is transmitted to the host device such as the personal computer and the like (steps S46, S47).

In the second example as well, the defective recording and reproducing device may be used even if the defect is initially present in the CCD 6 or if the defect is produced or increased through deterioration of the CCD.

Other Examples

In the above mentioned examples, a case in which the defect is found in the CCD 6 is given, but similar processes are performed when the defect is found in the SLM 5 to perform recording and reproducing properly. In the defect examining process using the known data, the information of the defective position relating to the SLM 5 is acquired and stored in the defective position storage section 39.

Further, not only when the defect is found in the CCD or the SLM but also when the defect is found in the recording optical component relating to recordation or the reproducing optical component relating to reproduction, detection is made to decide whether the defect is present in the recording component or the reproducing component.

In this case, the known page data D4 the same as that stored in the known data storage section 36 is recorded in a specific region of the medium 20 in advance.

The SLM 5 is a component used only in recording, and is not used in reproducing. Thus, when the known page data D4 recorded on the medium in advance is read and compared with the known page data D3 stored in the storage section 36 through the reproducing process, and if the data do not match, the defect is known to be in the reproducing optical component.

By combining the recording and reproducing process (first defective position examination) of the known page data D3 recorded in the known data storage section 36 of the device and the reproducing process (second defective position examination) of the known page data D4 recorded on the medium in advance, detection is made to decide whether the defective component is present in the reproducing component or the recording component.

The following three cases are assumed for the defect detection of the reproducing component and the recording component (see FIG. 8). A1, B1, C1 correspond to the first defective position examination, and A2, B2, C2 correspond to the second defective position examination.

(Case A)

(A1) When the known page data D3 in the known data storage section 36 of the device is recorded on the medium and the recorded known data D3' is reproduced, the defect is detected.

(A2) When the known page data D4 recorded on the medium in advance is reproduced, the defect is detected.

In either cases of A1 or A2, when unmatched data is found and the defect is detected, the defect is in the reproducing optical component including the CCD 6.

(Case B)

(B1) When the known page data D3 in the known data storage section 36 of the device is recorded on the medium and the recorded known data D3' is reproduced, unmatched data is not found and is normal.

(B2) When the known page data D4 recorded on the medium in advance is reproduced, the defect is detected.

If both B1 and B2 are realized, the defect is not present in the CCD 6 and the SLM 5, but the defect is present in the known data recorded in the medium 20.

(Case C)

(C1) When the known page data D3 in the known data storage section 36 of the device is recorded on the medium and the recorded known data D3' is reproduced, the defect is detected.

(C2) When the known page data D4 recorded on the medium in advance is reproduced, unmatched data is not found and is reproduced properly.

If both C1 and C2 are realized, the defect is not present in the CCD 6 but in the recording optical component including the SLM 5.

Through parallel movement of the relative position of the CCD 6 with respect to the reproduction light, detection is made to decide whether the defect is in the CCD or the defect is in the SLM 5.

For example, when the defect examining process is executed at a normal position of the CCD 6 and the defect is detected at a certain position T1, and if the defect is detected at the same position T1 of the CCD when the CCD 6 is moved parallel to shift the relative position of the CCD with respect to the reproduction light, that is, if the defective position did not move, the defect is present in the CCD 6.

If the defect is detected at a position T2 different from the first defective position T1 when the relative position of the CCD with respect to the reproduction light is shifted, the defective position has moved, and thus, the defect is present in the SLM 5.

If the defective component is specified to a certain extent, the device is fixed by simply changing the defective component. That is, time required for fixing is shortened, the load on the person responsible for the process is reduced, and the cost required for fixing is reduced.

What is claimed is:

1. A recording and reproducing device comprising:
a reference light irradiating section for irradiating a holographic recording medium with reference light for reading page data recorded on the holographic recording medium;
a spatial light modulating section for generating information light modulated using two-dimensional information corresponding to the page data to be written to the holographic recording medium;
an information light irradiating section for irradiating the same region as a region irradiated with the reference light, with the information light;

a light detecting section for receiving reproduction light generated by irradiating the holographic recording medium with the reference light;

a known data storage section for storing first known page data in advance;

a data recording control section for converting the first known page data stored in the known data storage section so that the converted page data can be supplied to the spatial light modulating section;

a defect examining section for distinctly examining a defective position of the spatial light modulating section and a defective position of the light detecting section, by irradiating the holographic recording medium with the information light modulated using the two-dimensional information corresponding to the first known page data and the reference light using the information light irradiating section and the reference light irradiating section to write the known page data to the holographic recording medium, and then by using the first known page data read from the reproduction light received by the light detecting section by irradiating the medium with the reference light using the reference light irradiating section, and second known page data recorded in advance on the holographic recording medium; and a reproducing control section for restoring and reproducing the original data of the defective position contained in the reproduction light received by the light detecting section using information of the defective position detected by the defect examining section, wherein the defect examining section includes a determining section for determining whether the defect is in the spatial light modulating section or the light detecting section based on the information of the defective position detected by the defective position examination.

2. The recording and reproducing device of claim 1, wherein the defect examining section includes:

a comparing section for comparing the known page data stored in the known data storage section and the known page data read from the holographic recording medium by way of the light detecting section; and a defective position storage section for storing information specifying the defective position of the light detecting section or the spatial light modulating section;

wherein the comparing section determines a position of unmatched data of the two compared known page data as a defective position and stores the information of the defective position to the defective position storage section.

3. The recording and reproducing device of claim 1, wherein the reproducing control section includes a correcting and decoding section for performing error correction to the reproducing data obtained from the reproduction light received by the light detecting section;

wherein the correcting and decoding section restores the original data by erasing and correcting the reproducing data of the defective position using the information of the defective position.

4. The recording and reproducing device of claim 3, wherein the correcting and decoding section is an ECC decoder.

5. The recording and reproducing device of claim 1, wherein the defect examining section performs examination of the defective position at a timing of switching on the power, of initialization, of a request for recording the user data or of a request for reproducing the user data, or at the lapse of every predetermined time.

6. The recording and reproducing device of claim 1, further comprising:

a recording control section for processing the user data to be written to the holographic recording medium into two-dimensional page data and supplying the data to the spatial light modulating section, controlling the reference light irradiating section and the information light irradiating section to irradiate the holographic recording medium with the reference light and the information light corresponding to the two-dimensional page data, and recording the two-dimensional page data, wherein when the defect examining section detects the defective position, the recording control section evacuates data D1 to be written to the defective position of the user data to an evacuating position different from the defective position in the two-dimensional page data, and generates the two-dimensional page data.

7. The recording and reproducing device of claim 6, wherein the evacuating position to which the data D1 to be written to the defective position is moved is a free space secured in advance in the two-dimensional page data.

8. The recording and reproducing device of claim 6, wherein the recording control section arranges specific dummy data to the defective position detected by the defect examining position, moves the data D1 to be written to the defective position to a position immediately after the defective position, and sequentially shifts and arranges the data rows following the data D1 and generates the two-dimensional page data.

9. The recording and reproducing device of claim 6, wherein the reproducing control section reproduces the two-dimensional page data recorded on the holographic recording medium from the reproduction light received by the light detecting section, and if a data D2 moved to the evacuated position in the reproduced two-dimensional page data is present, returns the data D2 to the original defective position.

10. The recording and reproducing device of claim 8, wherein the reproducing control section reproduces the two-dimensional page data recorded on the holographic recording medium from the reproduction light received by the light detecting section, and if the data row following the data D1 to be written to the defective position is shifted and arranged in the reproduced two-dimensional page data, deletes the dummy data arranged in the defective position, returns the data D1 to be written to the defective position to the defective position, inversely shifts the data row following the data D1 and reconfigures the two-dimensional page data.

11. The recording and reproducing device of claim 1, wherein a same data D4 as known page data D3 stored in the known data storage section is recorded in the holographic recording medium in advance;

wherein the defect examining section performs a first defective position examination for, after the known page data D3 is recorded to the holographic recording medium, reading the recorded data D3' and examining the defective position, and a second defective position examination for reading the data D4 recorded in the holographic recording medium in advance and examining the defective position.

12. The recording and reproducing device of claim 11, wherein when the defective position is detected by both the first and second defective position examinations, the determining section determines the defect to be in the light detecting section.

13. The recording and reproducing device of claim 11, wherein when the defective position is detected in the first defective position examination and the defect is not detected in the second defective position examination, the determining section determines the defect to be in the spatial light modulating section.

* * * * *